(12) United States Patent
Robshaw et al.

(10) Patent No.: US 12,086,668 B1
(45) Date of Patent: *Sep. 10, 2024

(54) ITEM IDENTIFICATION VIA RFID TAG SECRET

(71) Applicant: Impinj, Inc., Seattle, WA (US)

(72) Inventors: Matthew Robshaw, Seattle, WA (US); Tan Mau Wu, Seattle, WA (US); Christopher J. Diorio, Shoreline, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,311

(22) Filed: May 12, 2023

Related U.S. Application Data

(63) Continuation of application No. 17/472,770, filed on Sep. 13, 2021, now Pat. No. 11,651,180, which is a continuation of application No. 16/773,393, filed on Jan. 27, 2020, now Pat. No. 11,120,320.

(60) Provisional application No. 62/797,874, filed on Jan. 28, 2019.

(51) Int. Cl.
*G06K 19/07* (2006.01)
*G06K 17/00* (2006.01)
*H04L 9/08* (2006.01)
*H04L 9/32* (2006.01)

(52) U.S. Cl.
CPC ..... *G06K 19/0723* (2013.01); *G06K 17/0029* (2013.01); *H04L 9/0861* (2013.01); *H04L 9/3226* (2013.01)

(58) Field of Classification Search
CPC ............ G06K 19/0723; G06K 17/0029; H04L 9/0861; H04L 9/3226
USPC ......................................................... 235/375
See application file for complete search history.

(56) References Cited

U.S. PATENT DOCUMENTS

| | | |
|---|---|---|
| 9,565,022 B1 | 2/2017 | Robshaw et al. |
| 2011/0025458 A1 | 2/2011 | Rokhsaz et al. |
| 2011/0291803 A1 | 12/2011 | Bajic et al. |
| 2013/0206837 A1 | 8/2013 | Szu |
| 2016/0034728 A1 | 2/2016 | Oliver et al. |
| 2016/0110571 A1 | 4/2016 | Jung et al. |
| 2017/0250808 A1 | 8/2017 | Jordahl |
| 2018/0108024 A1 | 4/2018 | Greco et al. |

OTHER PUBLICATIONS

Office Action received for U.S. Appl. No. 16/773,393, mailed Dec. 21, 2020 and filed Mar. 19, 2021, pp. 8.

*Primary Examiner* — Allyson N Trail
(74) *Attorney, Agent, or Firm* — Turk IP Law, LLC

(57) ABSTRACT

A method is provided to determine unique identifiers. A physical item has an RFID integrated circuit (IC) having a unique identifier and a secret. The RFID IC may be configured to provide an identifier portion and a response to a previously sent challenge, where the identifier portion by itself is insufficient to completely identify the IC or item and the response is based on the challenge and the secret. Attempts are made to verify the response using a set of potential secrets determined using the identifier portion. If the response is successfully verified using a certain secret, the secret may then be used to determine one or more other identifier portions. The unique, complete identifier may then be determined from a combination of at least the identifier portions.

20 Claims, 6 Drawing Sheets

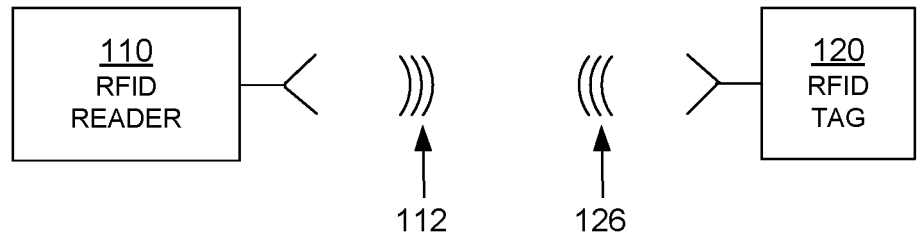
FIG. 1
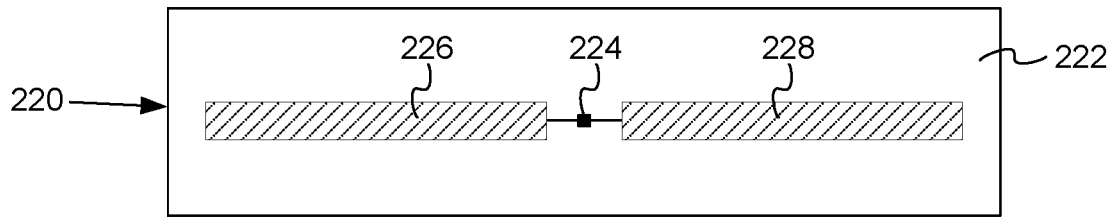
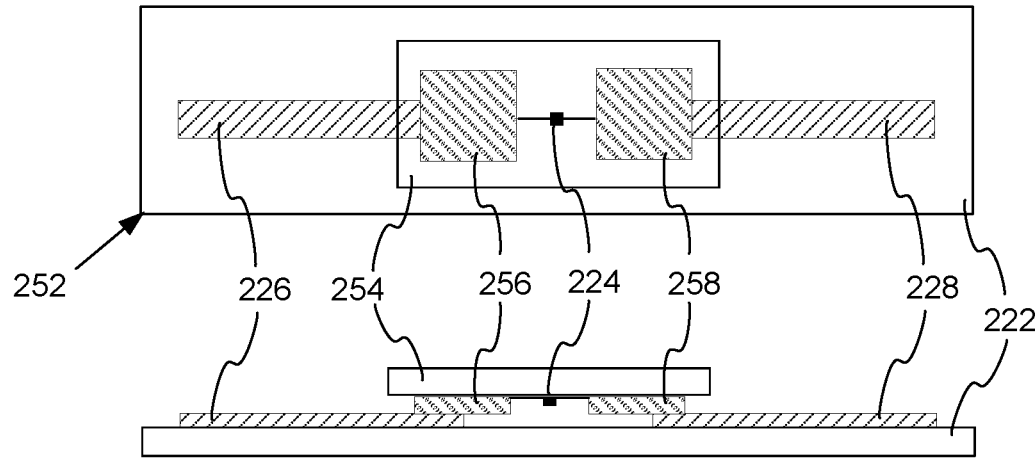
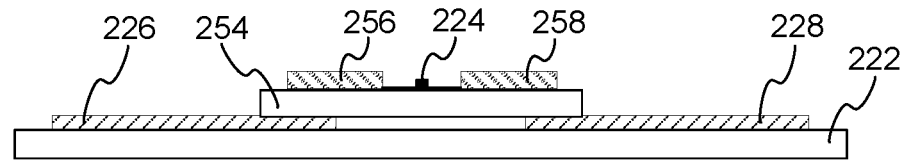
FIG. 2

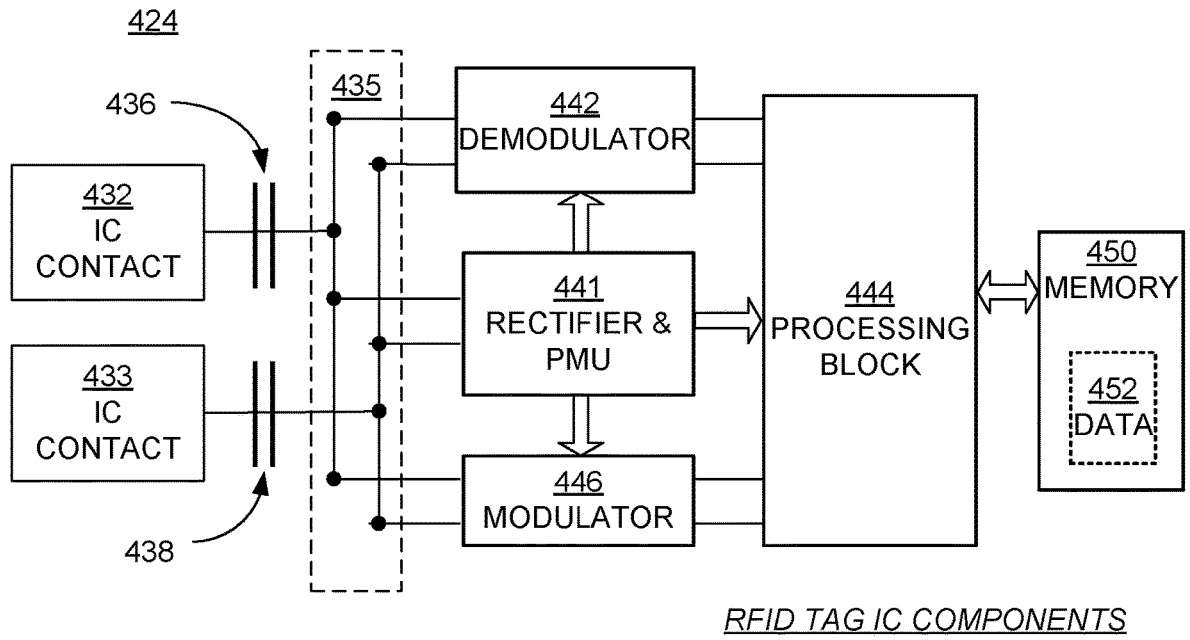
FIG. 4
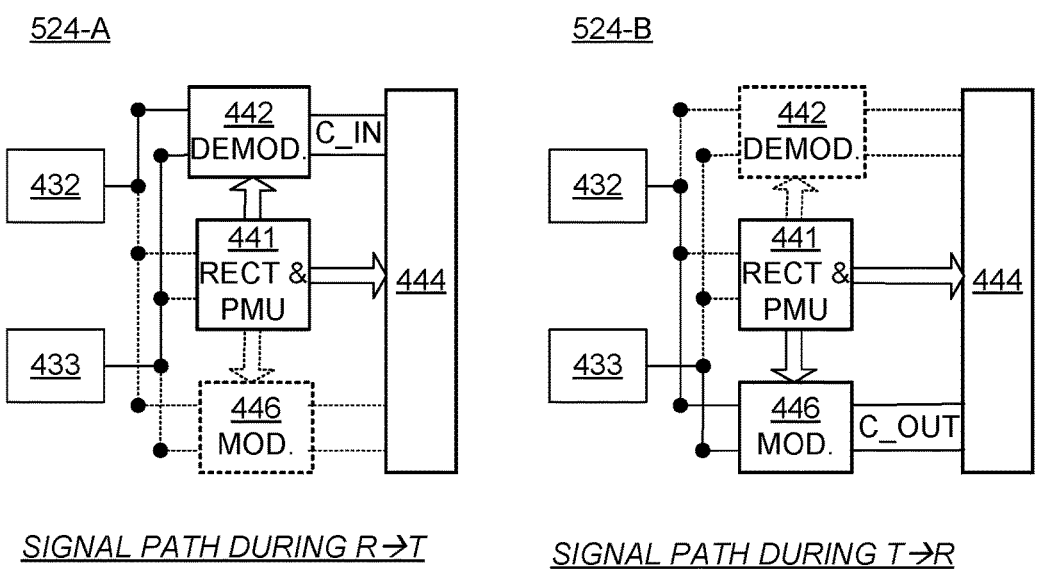
FIG. 5A  FIG. 5B

ITEM IDENTIFICATION VIA RFID TAG SECRET

CROSS REFERENCE TO RELATED APPLICATIONS

This application is a continuation of U.S. application Ser. No. 17/472,770 filed on Sep. 13, 2021, which is a continuation of U.S. application Ser. No. 16/773,393 filed on Jan. 27, 2020, which in turn claims the benefit of U.S. Provisional Patent Application Ser. No. 62/797,874 filed on Jan. 28, 2019. The disclosures of the above application are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to inventory one or more RFID tags, where inventorying involves singulating a tag, receiving an identifier from a tag, and/or acknowledging a received identifier (e.g., by transmitting an acknowledge command). "Singulated" is defined as a reader singling-out one tag, potentially from among multiple tags, for a reader-tag dialog. "Identifier" is defined as a number identifying the tag or the item to which the tag is attached, such as a tag identifier (TID), electronic product code (EPC), etc. The reader transmitting a Radio-Frequency (RF) wave performs the interrogation. The RF wave is typically electromagnetic, at least in the far field. The RF wave can also be predominantly electric or magnetic in the near or transitional near field. The RF wave may encode one or more commands that instruct the tags to perform one or more actions.

In typical RFID systems, an RFID reader transmits a modulated RF inventory signal (a command), receives a tag reply, and transmits an RF acknowledgement signal responsive to the tag reply. A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section includes an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to the determination of unique identifiers. A physical item has an RFID integrated circuit (IC) having a unique identifier and a secret. The RFID IC may be configured to provide an identifier portion and a response to a previously sent challenge, where the identifier portion by itself is insufficient to uniquely identify the IC or item and the response is based on the challenge and the secret. Attempts are made to verify the response using a set of potential secrets determined using the identifier portion. If the response is successfully verified using a certain secret, the secret may then be used to determine one or more other identifier portions. The complete identifier may then be determined from a combination of at least the identifier portions.

According to one example, an RFID reader system configured to identify and authenticate an RFID tag storing a tag key and associated with a complete identifier but only storing a first portion of the complete identifier is provided. The system includes a reader module configured to communicate with RFID tags and a processor coupled to the reader module. The processor is configured to request and receive, via the reader module, the first portion from the tag; send, via the reader module, a challenge to the tag; and receive, via the reader module, a cryptographic response from the tag. The processor is further configured to determine a set of identifiers having the first portion and determine a set of potential keys associated with the set of identifiers, where each potential key is associated with a respective identifier in the set of identifiers. The processor is further configured to identify a correct key corresponding to the tag key by attempting to recover the challenge from the cryptographic response using multiple potential keys, correctly recovering the challenge from the cryptographic response using a first one of the multiple potential keys, and selecting the first potential key as the correct key. The processor is further configured to use the correct key to authenticate the tag and determine another portion of the complete identifier different from the first portion, combine at least the first and other portions to form the complete identifier, and identify the tag using the complete identifier.

According to another example, a network component configured to identify and authenticate an RFID tag storing a tag key and associated with a complete identifier but only storing a first portion of the complete identifier is provided. The component includes an interface configured to communicate with an RFID reader system communicating with the RFID tag and a processor coupled to the interface. The processor is configured to receive, via the interface, the first portion and a cryptographic response based on a challenge; determine a set of identifiers having the first portion; and determine a set of potential keys associated with the set of identifiers, where each potential key is associated with a respective identifier in the set of identifiers. The processor is further configured to identify a correct key corresponding to the tag key by attempting to recover the challenge from the cryptographic response using multiple potential keys, correctly recovering the challenge from the cryptographic response using a first one of the multiple potential keys, and selecting the first potential key as the correct key. The processor is further configured to use the correct key to authenticate the tag and determine another portion of the complete identifier different from the first portion, combine at least the first and the other portions to form the complete identifier, and identify the tag using the complete identifier.

According to a further example, a service configured to execute on a network server and to identify and authenticate an RFID tag storing a tag key and associated with a complete identifier but only storing a first portion of the complete identifier is provided. The service is configured to receive, from a network interface, the first portion and a cryptographic response based on a previously provided challenge. The service is further configured to determine a set of identifiers having the first portion and determine a set of potential keys associated with the set of identifiers, where each potential key is associated with a respective identifier in the set of identifiers. The service is further configured to attempt to recover the challenge from the cryptographic response using a plurality of the potential keys and correctly recover the challenge from the cryptographic response using a first one of the potential keys. The service is further configured to use the first potential key to authenticate the tag and determine another portion of the complete identifier different from the first portion, combine at least the first and other portions to form the complete identifier, and identify the tag using the complete identifier.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 1 is a block diagram of components of an RFID system.

FIG. 2 is a diagram showing components of a passive RFID tag, such as a tag that can be used in the system of FIG. 1.

FIG. 4 is a block diagram showing a detail of an RFID tag, such as the one shown in FIG. 2.

FIGS. 5A and 5B illustrate signal paths during tag-to-reader and reader-to-tag communications in the block diagram of FIG. 4.

DETAILED DESCRIPTION

Figure 3:
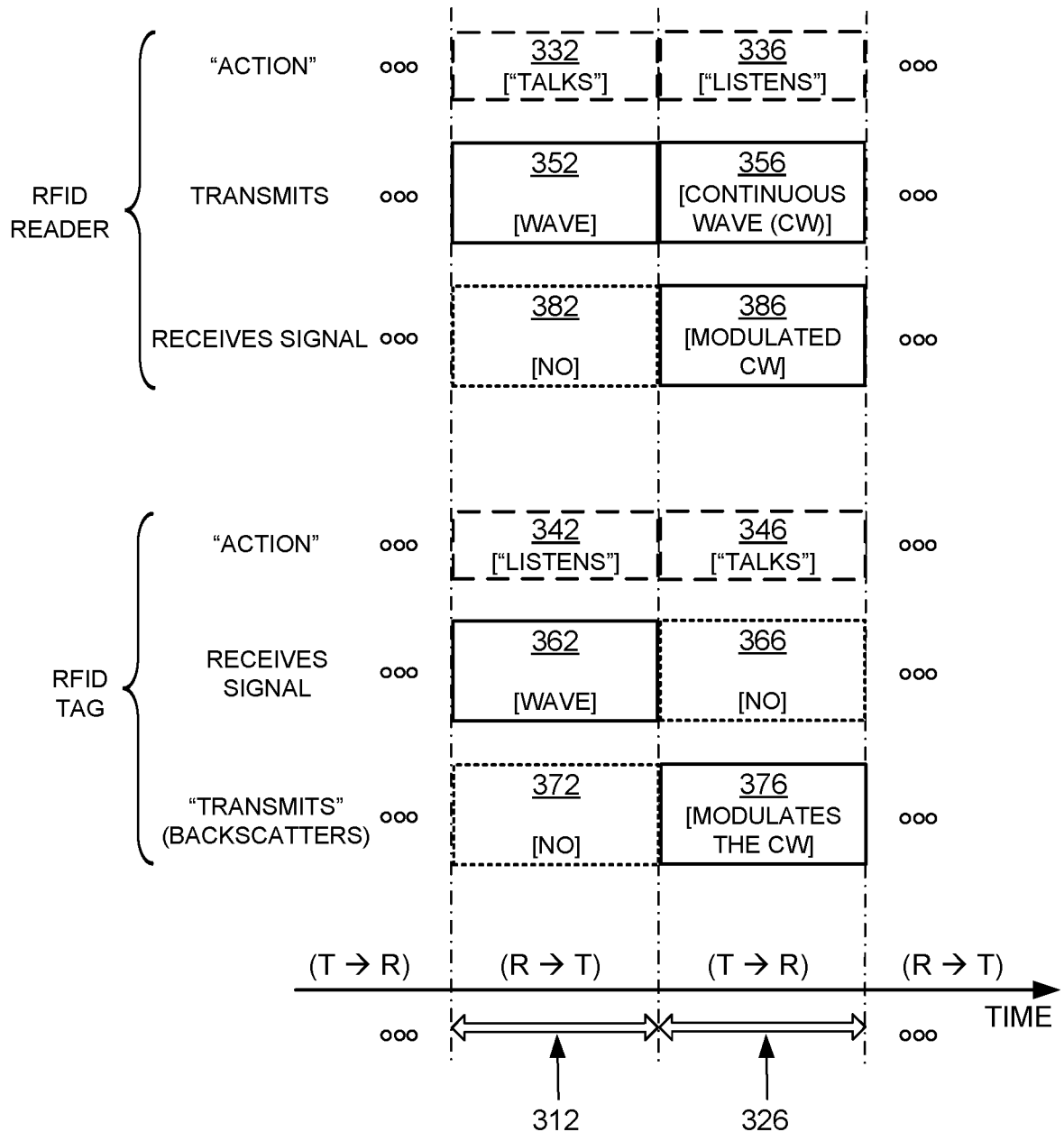
FIG. 3 is a conceptual diagram for explaining a half-duplex mode of communication between the components of the RFID system of FIG. 1.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar volatile and nonvolatile information-storage technologies. Some portions of memory may be writeable and some not. "Instruction" refers to a request to a tag to perform a single explicit action (e.g., write data into memory). "Command" refers to a reader request for one or more tags to perform one or more actions, and includes one or more tag instructions preceded by a command identifier or command code that identifies the command and/or the tag instructions. "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Specification"), versions 1.2.0 and 2.0 of which are hereby incorporated by reference.

FIG. 1 is a diagram of the components of a typical RFID system 100, incorporating embodiments. An RFID reader 110 and a nearby RFID tag 120 communicate via RF signals 112 and 126. When sending data to tag 120, reader 110 may generate RF signal 112 by encoding the data, modulating an RF waveform with the encoded data, and transmitting the modulated RF waveform as RF signal 112. In turn, tag 120 may receive RF signal 112, demodulate encoded data from RF signal 112, and decode the encoded data. Similarly, when sending data to reader 110 tag 120 may generate RF signal 126 by encoding the data, modulating an RF waveform with the encoded data, and causing the modulated RF waveform to be sent as RF signal 126. The data sent between reader 110 and tag 120 may be represented by symbols, also known as RFID symbols. A symbol may be a delimiter, a calibration value, or implemented to represent binary data, such as "0" and "1", if desired. Upon processing by reader 110 and tag 120, symbols may be treated as values, numbers, or any other suitable data representations.

The RF waveforms transmitted by reader 110 and/or tag 120 may be in a suitable range of frequencies, such as those near 900 MHZ, 13.56 MHz, or similar. In some embodiments, RF signals 112 and/or 126 may include non-propagating RF signals, such as reactive near-field signals or similar. RFID tag 120 may be active or battery-assisted (i.e., possessing its own power source), or passive. In the latter case, RFID tag 120 may harvest power from RF signal 112.

FIG. 2 is a diagram of an RFID tag 220, which may function as tag 120 of FIG. 1. Tag 220 may be formed on a substantially planar inlay 222, which can be made in any suitable way. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for transmitting and/or interacting with RF signals. The antenna may be flat and attached to inlay 222. IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the terms "electrically isolated" or "electrically decoupled" as used herein mean that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments. Antenna segments 226 and 228 are depicted as separate from IC 224, but in other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments, the positions of strap substrate 254 and inlay 222 may be reversed, with strap substrate 254 mounted beneath inlay 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna couples with RF signals in the environment and propagates the signals to IC 224, which may both harvest power and respond if appropriate, based on the incoming signals and the IC's internal state. If IC 224 uses backscatter modulation then it may generate a response signal (e.g., signal 126) from an RF signal in the environment (e.g., signal 112) by modulating the antenna's reflectance. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance. If IC 224 is capable of transmitting signals (e.g., has its own power source, is coupled to an external power source, and/or is able to harvest sufficient power to transmit signals), then IC 224 may respond by transmitting response signal 126. In the embodiments of FIG. 2, antenna segments 226 and 228 are separate from IC 224. In other embodiments, the antenna segments may alternatively be formed on IC 224.

An RFID tag such as tag 220 is often attached to or associated with an individual item or the item packaging. An RFID tag may be fabricated and then attached to the item or packaging, or may be partly fabricated before attachment to the item or packaging and then completely fabricated upon attachment to the item or packaging. In some embodiments, the manufacturing process of the item or packaging may include the fabrication of an RFID tag. In these embodiments, the resulting RFID tag may be integrated into the item or packaging, and portions of the item or packaging may serve as tag components. For example, conductive item or packaging portions may serve as tag antenna segments or contacts. Nonconductive item or packaging portions may serve as tag substrates or inlays. If the item or packaging includes integrated circuits or other circuitry, some portion of the circuitry may be configured to operate as part or all of an RFID tag IC. An "RFID IC" may refer to an item capable of receiving and responding to RFID signals. For example, an item having a separate but attached RFID tag can be considered an RFID IC, as is an item having an integrated RFID tag or an item manufactured to have the capabilities of an RFID tag. A standalone RFID tag may also be referred to as an "RFID IC".

The components of the RFID system of FIG. 1 may communicate with each other in any number of modes. One such mode is called full duplex, where both reader 110 and tag 120 can transmit at the same time. In some embodiments, RFID system 100 may be capable of full duplex communication. Another such mode, which may be more suitable for passive tags, is called half-duplex, and is described below.

FIG. 3 is a conceptual diagram 300 for explaining half-duplex communications between the components of the RFID system of FIG. 1, in this case with tag 120 implemented as a passive tag. The explanation is made with reference to a TIME axis, and also to a human metaphor of "talking" and "listening". The actual technical implementations for "talking" and "listening" are now described.

In a half-duplex communication mode, RFID reader 110 and RFID tag 120 talk and listen to each other by taking turns. As seen on axis TIME, reader 110 talks to tag 120 during intervals designated "R→T", and tag 120 talks to reader 110 during intervals designated "T→R". For example, a sample R→T interval occurs during time interval 312, during which reader 110 talks (block 332) and tag 120 listens (block 342). A following sample T→R interval occurs during time interval 326, during which reader 110 listens (block 336) and tag 120 listens (block 346). Interval 312 may be of a different duration than interval 326—here the durations are shown approximately equal only for purposes of illustration.

During interval 312, reader 110 transmits a signal such as signal 112 described in FIG. 1 (block 352), while tag 120 receives the reader signal (block 362), processes the reader signal to extract data, and harvests power from the reader signal. While receiving the reader signal, tag 120 does not backscatter (block 372), and therefore reader 110 does not receive a signal from tag 120 (block 382).

During interval 326, also known as a backscatter time interval or backscatter interval, reader 110 does not transmit a data-bearing signal. Instead, reader 110 transmits a continuous wave (CW) signal, which is a carrier that generally does not encode information. The CW signal provides energy for tag 120 to harvest as well as a waveform that tag 120 can modulate to form a backscatter response signal. Accordingly, during interval 326 tag 120 is not receiving a signal with encoded information (block 366) and instead modulates the CW signal (block 376) to generate a backscatter signal such as signal 126 described in FIG. 2. Tag 120 may modulate the CW signal to generate a backscatter signal by adjusting its antenna reflectance, as described above. Reader 110 then receives and processes the backscatter signal (block 386).

FIG. 4 is a block diagram showing a detail of an RFID IC, such as IC 224 in FIG. 2. Electrical circuit 424 may be implemented in an IC, such as IC 224. Circuit 424 implements at least two IC contacts 432 and 433, suitable for coupling to antenna segments such as antenna segments 226/228 in FIG. 2. When two IC contacts form the signal input from and signal return to an antenna they are often referred-to as an antenna port. IC contacts 432 and 433 may be made in any suitable way, such as from electrically conductive pads, bumps, or similar. In some embodiments circuit 424 implements more than two IC contacts, especially when configured with multiple antenna ports and/or to couple to multiple antennas.

Circuit 424 includes signal-routing section 435 which may include signal wiring, signal-routing busses, receive/transmit switches, and similar that can route signals between the components of circuit 424. IC contacts 432/433 may couple galvanically, capacitively, and/or inductively to signal-routing section 435. For example, optional capacitors 436 and/or 438 may capacitively couple IC contacts 432/433 to signal-routing section 435, thereby galvanically decoupling IC contacts 432/433 from signal-routing section 435 and other components of circuit 424.

Capacitive coupling (and the resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In these embodiments, galvanically decoupling IC contact 432 from IC contact 433 may prevent the formation of a short circuit between the IC contacts through the tuning loop.

Capacitors 436/438 may be implemented within circuit 424 and/or partly or completely external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 includes a rectifier and PMU (Power Management Unit) 441 that harvests energy from the RF signal incident on antenna segments 226/228 to power the circuits of IC 424 during either or both reader-to-tag (R→T) and tag-to-reader (T→R) intervals. Rectifier and PMU 441 may be implemented in any way known in the art, and may include one or more components configured to convert an alternating-current (AC) or time-varying signal into a direct-current (DC) or substantially time-invariant signal.

Circuit 424 also includes a demodulator 442, a processing block 444, a memory 450, and a modulator 446. Demodulator 442 demodulates the RF signal received via IC contacts 432/433, and may be implemented in any suitable way, for example using a slicer, an amplifier, and other similar components. Processing block 444 receives the output from demodulator 442, performs operations such as command decoding, memory interfacing, and other related operations, and may generate an output signal for transmission. Processing block 444 may be implemented in any suitable way, for example by combinations of one or more of a processor, memory, decoder, encoder, and other similar components. Memory 450 stores data 452, and may be at least partly implemented as a nonvolatile memory (NVM) configured to retain data 452 even when circuit 424 does not have power. Processing block 444 may be configured to read data from and/or write data to memory 450.

Modulator 446 generates a modulated signal from the output signal generated by processing block 444. In one embodiment, modulator 446 generates the modulated signal by driving the load presented by antenna segment(s) coupled to IC contacts 432/433 to form a backscatter signal as described above. In another embodiment, modulator 446 includes and/or uses an active transmitter to generate and send the modulated signal via antenna segment(s) coupled to IC contacts 432/433. Modulator 446 may be implemented in any suitable way, for example using a switch, driver, amplifier, and other similar components. Demodulator 442 and modulator 446 may be separate components, combined in a single transceiver circuit, and/or part of processing block 444.

In some embodiments, particularly in those with more than one antenna port, circuit 424 may contain multiple demodulators, rectifiers, PMUs, modulators, processing blocks, and/or memories.

FIG. 5A shows version 524-A of components of circuit 424 of FIG. 4, further modified to emphasize a signal operation during a R→T interval (e.g., time interval 312 of FIG. 3). During the R→T interval, demodulator 442 demodulates an RF signal received from IC contacts 432/433. The demodulated signal is provided to processing block 444 as C_IN, which in some embodiments may include a received stream of symbols. Rectifier and PMU 441 may be active, for example harvesting power from an incident RF waveform and providing power to demodulator 442, processing block 444, and other circuit components. During the R→T interval, modulator 446 is not actively modulating a signal, and in fact may be decoupled from the RF signal. For example, signal routing section 435 may be configured to decouple modulator 446 from the RF signal, or an impedance of modulator 446 may be adjusted to decouple it from the RF signal.

FIG. 5B shows version 524-B of components of circuit 424 of FIG. 4, further modified to emphasize a signal operation during a T→R interval (e.g., time interval 326 of FIG. 3). During the T→R interval, processing block 444 outputs a signal C_OUT, which may include a stream of symbols for transmission. Modulator 446 then generates a modulated signal from C_OUT and sends the modulated signal via antenna segment(s) coupled to IC contacts 432/ 433, as described above. During the T→R interval, rectifier and PMU 441 may be active, while demodulator 442 may not be actively demodulating a signal. In some embodiments, demodulator 442 may be decoupled from the RF signal during the T→R interval. For example, signal routing section 435 may be configured to decouple demodulator 442 from the RF signal, or an impedance of demodulator 442 may be adjusted to decouple it from the RF signal.

In typical embodiments, demodulator 442 and modulator 446 are operable to demodulate and modulate signals according to a protocol, such as the Gen2 Specification mentioned above. In embodiments where circuit 424 includes multiple demodulators and/or modulators, each may be configured to support different protocols or different sets of protocols. A protocol specifies, in part, symbol encodings, and may include a set of modulations, rates, timings, or any other parameter associated with data communications. In addition, a protocol can be a variant of a stated specification such as the Gen2 Specification, for example including fewer or additional commands than the stated specification calls for, and so on. In such instances, additional commands are sometimes called custom commands.

Figure 6:
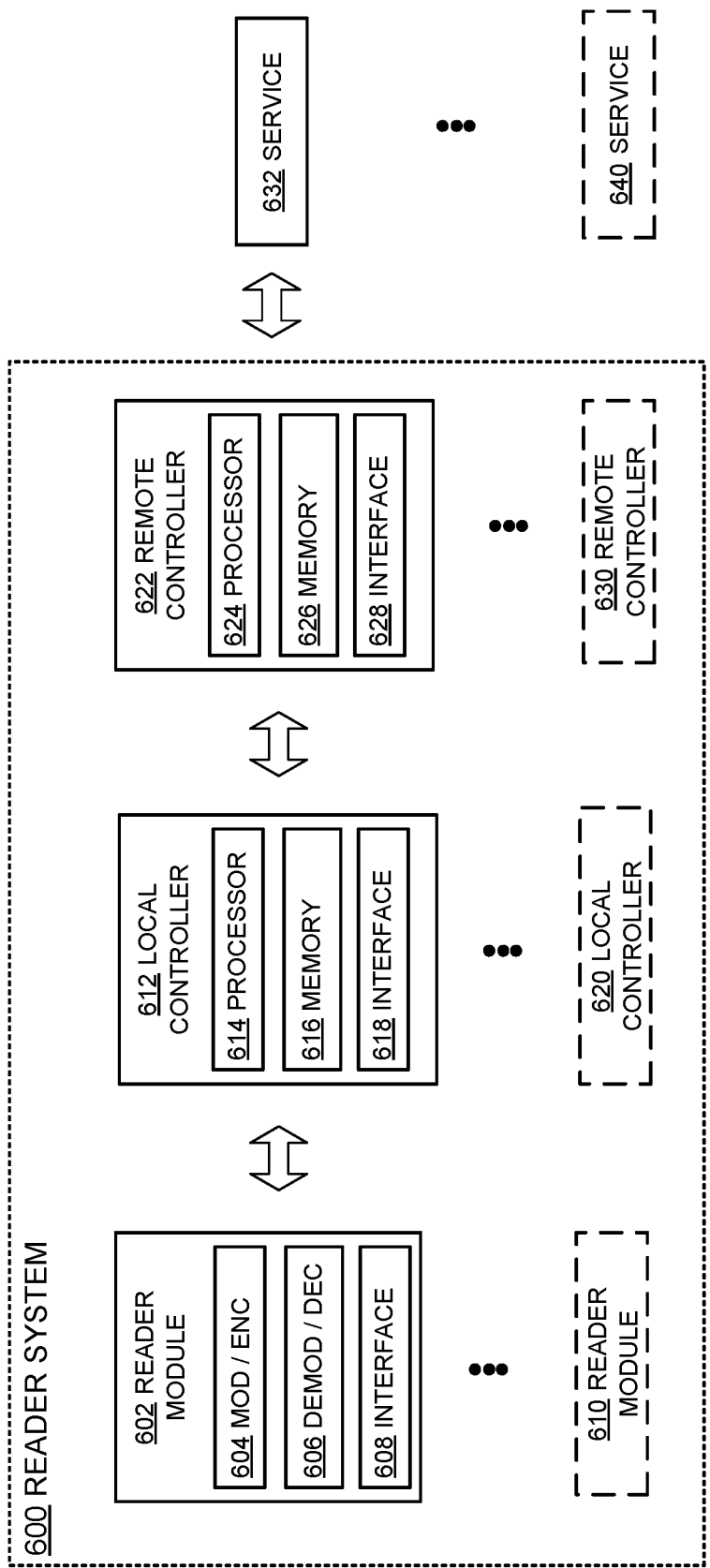
FIG. 6 is a block diagram showing a detail of an RFID reader system, such as the one shown in FIG. 1.

FIG. 6 depicts an RFID reader system 600 according to embodiments. Reader system 600 is configured to communicate with RFID tags and optionally to communicate with entities external to reader system 600, such as a service 632. Reader system 600 includes at least one reader module 602, configured to transmit signals to and receive signals from RFID tags. Reader system 600 further includes at least one local controller 612, and in some embodiments includes at least one remote controller 622. Controllers 612 and/or 622 are configured to control the operation of reader module 602, process data received from RFID tags communicating through reader module 602, communicate with external entities such as service 632, and otherwise control the operation of reader system 600.

In some embodiments, reader system 600 may include multiple reader modules, local controllers, and/or remote controllers. For example, reader system 600 may include at least one other reader module 610, at least one other local controller 620, and/or at least one other remote controller 630. A single reader module may communicate with multiple local and/or remote controllers, a single local controller may communicate with multiple reader modules and/or remote controllers, and a single remote controller may communicate with multiple reader modules and/or local controllers. Similarly, reader system 600 may be configured to communicate with multiple external entities, such as other reader systems (not depicted) and multiple services (for example, services 632 and 640).

Reader module 602 includes a modulator/encoder block 604, a demodulator/decoder block 606, and an interface block 608. Modulator/encoder block 604 may encode and modulate data for transmission to RFID tags. Demodulator/ decoder block 606 may demodulate and decode signals received from RFID tags to recover data sent from the tags. The modulation, encoding, demodulation, and decoding may be performed according to a protocol or specification, such as the Gen2 Specification. Reader module 602 may use interface block 608 to communicate with local controller 612 and/or remote controller 622, for example to exchange tag data, receive instructions or commands, or to exchange other relevant information.

Reader module 602 and blocks 604/606 are coupled to one or more antennas and/or antenna drivers (not depicted), for transmitting and receiving RF signals. In some embodiments, reader module 602 is coupled to multiple antennas and/or antenna drivers. In these embodiments, reader module 602 may transmit and/or receive RF signals on the different antennas in any suitable scheme. For example, reader module 602 may switch between different antennas to transmit and receive RF signals, transmit on one antenna but receive on another antenna, or transmit and/or receive on multiple antennas simultaneously. In some embodiments, reader module 602 may be coupled to one or more phased-array or synthesized-beam antennas whose beams can be generated and/or steered, for example by reader module 602, local controller 612, and/or remote controller 622.

Modulator/encoder block 604 and/or demodulator/decoder block 606 may be configured to perform conversion between analog and digital signals. For example, modulator/ encoder block 604 may convert a digital signal received via interface block 608 to an analog signal for subsequent transmission, and demodulator/decoder block 606 may convert a received analog signal to a digital signal for transmission via interface block 608.

Local controller 612 includes a processor block 612, a memory 616, and an interface 618. Remote controller 622 includes a processor block 622, a memory 626, and an interface 628. Local controller 612 differs from remote controller 622 in that local controller 612 is co-located or at least physically near reader module 602, whereas remote controller 622 is not physically near reader module 602. For example, local Processor blocks 612 and/or 622 may be configured to, alone or in combination, provide different functions. Such functions may include the control of other components, such as memory, interface blocks, reader modules, and similar; communication with other components such as reader module 620, other reader systems, services 632/640, and similar; data-processing or algorithmic processing such as encryption, decryption, authentication, and similar; or any other suitable function. In some embodiments, processor blocks 612/622 may be configured to convert analog signals to digital signals or vice-versa, as described above in relation to blocks 604/606; processor blocks 612/622 may also be configured to perform any suitable analog signal processing or digital signal processing, such as filtering, carrier cancellation, noise determination, and similar.

Processor blocks 612/622 may be configured to provide functions by execution of instructions or applications, which may be retrieved from memory (for example, memory 616 and/or 626) or received from some other entity. Processor blocks 612/622 may be implemented in any suitable way. For example, processor blocks 612/622 may be implemented using digital and/or analog processors such as microprocessors and digital-signal processors (DSPs); controllers such as microcontrollers; software running in a machine such as a general purpose computer; programmable circuits such as field programmable gate arrays (FPGAs), field-programmable analog arrays (FPAAs), programmable logic devices (PLDs), application specific integrated circuits (ASIC), any combination of one or more of these; and equivalents.

Memories 616/626 are configured to store information, and may be implemented in any suitable way, such as the memory types described above, any combination thereof, or any other known memory or information storage technology. Memories 616/626 may be implemented as part of their associated processor blocks (e.g., processor blocks 614/624)

or separately. Memories 616/626 may store instructions, programs, or applications for processor blocks 614/624 to execute. Memories 616/626 may also store other data, such as files, media, component configurations or settings, etc.

In some embodiments, memories 616/626 store tag data. Tag data may be data read from tags, data to be written to tags, and/or data associated with tags or tagged items. Tag data may include identifiers for tags such as electronic product codes (EPCs), tag identifiers (TIDs), or any other information suitable for identifying individual tags. Tag data may also include tag passwords, tag profiles, tag cryptographic keys (secret or public), tag key generation algorithms, and any other suitable information about tags or items associated with tags.

Memories 616/626 may also store information about how reader system 600 is to operate. For example, memories 616/626 may store information about algorithms for encoding commands for tags, algorithms for decoding signals from tags, communication and antenna operating modes, encryption/authentication algorithms, tag location and tracking algorithms, cryptographic keys and key pairs (such as public/private key pairs) associated with reader system 600 and/or other entities, electronic signatures, and similar.

Interface blocks 608, 618, and 628 are configured to communicate with each other and with other suitably configured interfaces. The communications between interface blocks occur via the exchange of signals containing data, instructions, commands, or any other suitable information. For example, interface block 608 may receive data to be written to tags, information about the operation of reader module 602 and its constituent components, and similar; and may send data read from tags. Interface blocks 618 and 628 may send and receive tag data, information about the operation of other components, other information for enabling local controller 612 and remote controller 622 to operate in conjunction, and similar. Interface blocks 608/618/628 may also communicate with external entities, such as services 632, 640, other services, and/or other reader systems.

Interface blocks 608/618/628 may communicate using any suitable wired or wireless means. For example, interface blocks 608/618/628 may communicate over circuit traces or interconnects, or other physical wires or cables, and/or using any suitable wireless signal propagation technique. In some embodiments, interface blocks 608/618/628 may communicate via an electronic communications network, such as a local area network (LAN), a metropolitan area network (MAN), a wide area network (WAN), a network of networks such as the internet. Communications from interface blocks 608/618/628 may be secured, for example via encryption and other electronic means, or may be unsecured.

Reader system 600 may be implemented in any suitable way. One or more of the components in reader system 600 may be implemented as integrated circuits using CMOS technology, BJT technology, MESFET technology, and/or any other suitable physical implementation technology. Components may also be implemented as software executing on general-purpose or application-specific hardware.

In one embodiment, a "reader" as used in this disclosure may include at least one reader module like reader module 602 and at least one local controller such as local controller 612. Such a reader may or may not include any remote controllers such as remote controller 622. A reader including a reader module and a local controller may be implemented as a standalone device or as a component in another device. In some embodiments, a reader may be implemented as a mobile device, such as a handheld reader, or as a component in a mobile device such as a laptop, tablet, smartphone, wearable device, or any other suitable mobile device.

Remote controller 622, if not included in a reader, may be implemented separately. For example, remote controller 622 may be implemented as a local host, a remote server, or a database, coupled to one or more readers via one or more communications networks. In some embodiments, remote controller 622 may be implemented as an application executing on a cloud or at a datacenter.

Functionality within reader system 600 may be distributed in any suitable way. For example, the encoding and/or decoding functionalities of blocks 604 and 606 may be performed by processor blocks 614 and/or 624. In some embodiments, processor blocks 614 and 624 may cooperate to execute an application or perform some functionality. One of local controller 612 and remote controller 622 may not implement memory, with the other controller providing memory.

Reader system 600 may communicate with at least one service 632. Service 632 provides one or more features, functions, and/or capabilities associated with one or more entities, such as reader systems, tags, tagged items, and similar. Such features, functions, and/or capabilities may include the provision of information associated with the entity, such as warranty information, repair/replacement information, upgrade/update information, and similar; and the provision of services associated with the entity, such as storage and/or access of entity-related data, location tracking for the entity, entity security services (e.g., authentication of the entity), entity privacy services (e.g., who is allowed access to what information about the entity), and similar. Service 632 may be separate from reader system 600, and the two may communicate via one or more networks.

In some embodiments, an RFID reader or reader system implements the functions and features described above at least partly in the form of firmware, software, or a combination, such as hardware or device drivers, an operating system, applications, and the like. In some embodiments, interfaces to the various firmware and/or software components may be provided. Such interfaces may include application programming interfaces (APIs), libraries, user interfaces (graphical and otherwise), or any other suitable interface. The firmware, software, and/or interfaces may be implemented via one or more processor blocks, such as processor blocks 614/624. In some embodiments, at least some of the reader or reader system functions and features can be provided as a service, for example, via service 632 or service 640.

Figure 7:
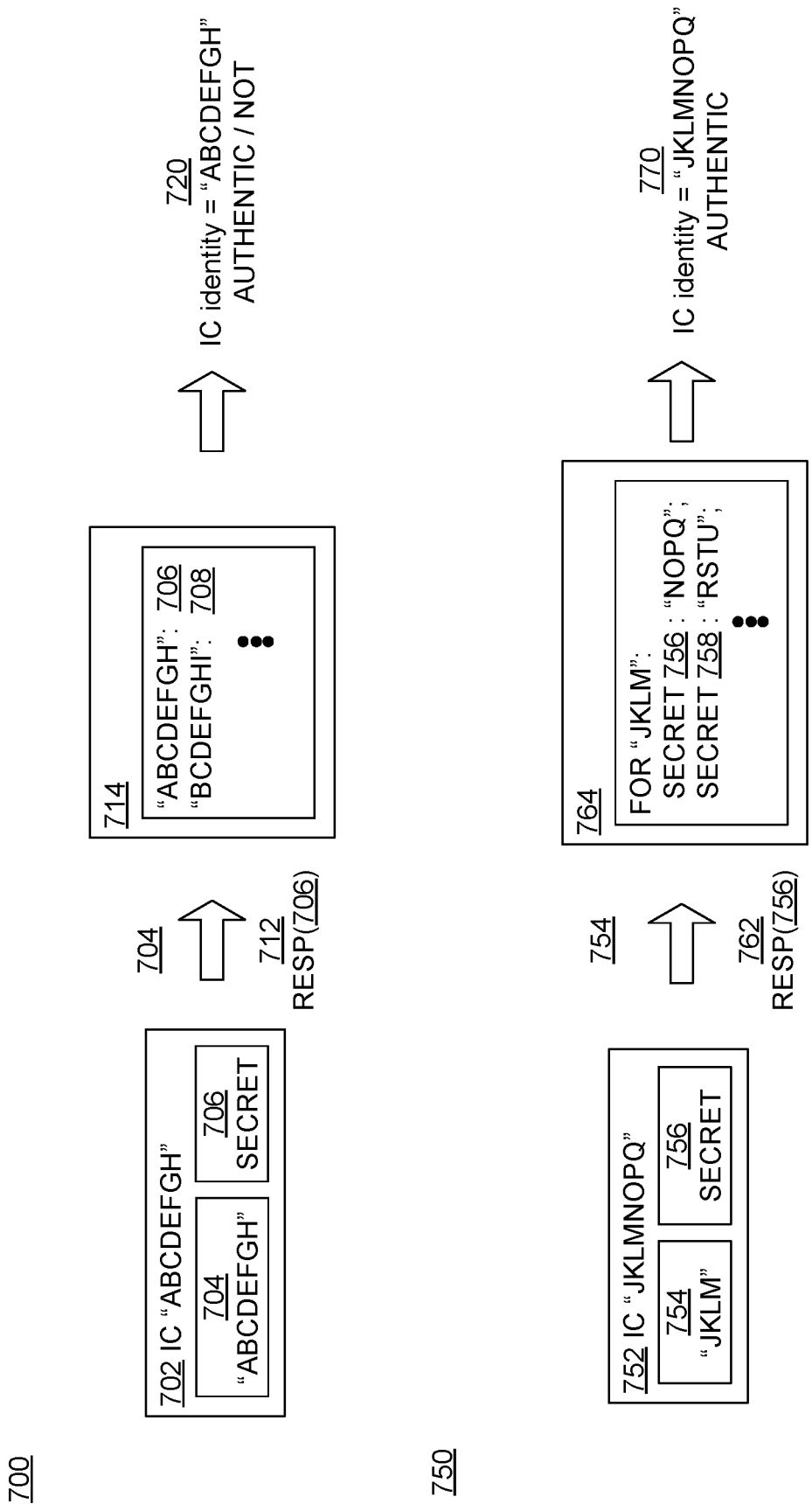
FIG. 7 depicts how a secret stored on an RFID IC can be used to determine a unique identifier for the IC, according to embodiments.

FIG. 7 depicts how an RFID IC can be uniquely identified, according to embodiments.

RFID systems can be used to identify and track individual items with RFID tags. In an ideal situation, an RFID reader system can distinguish individual items from other, surrounding items. This may be facilitated by storing a unique, publicly readable identifier on the RFID tag(s) attached to each item. An RFID reader system, upon reading the unique identifier, can then use the identifier to distinguish the associated item from other items.

In diagram 700, an RFID IC 702, associated with the unique identifier "ABCDEFGH", also stores the unique identifier as identifier 704. An RFID reader system, upon inventorying RFID IC 702, can retrieve the stored identifier 704. Upon retrieving the identifier 704, the RFID reader system can uniquely identify RFID IC 702 as the IC associated with identifier "ABCDEFGH".

In addition to an identifier, an RFID IC may also store a secret or key used for cryptographic operations. As with identifiers, cryptographic secrets may be unique to individual RFID ICs (at least to the extent possible given a finite-length secret), to prevent confusion between different RFID ICs. Unlike other identifiers, an RFID IC's secret usually cannot be publicly read.

In diagram 700, RFID IC 702 also stores secret 706. Secret 706 may be uniquely (at least within the constraints of a finite-length secret) associated with RFID IC 702. In other embodiments, a secret may be shared by multiple RFID ICs (for example, a group key). An RFID reader system can cryptographically exchange information with RFID IC 702 such that RFID IC 702 sends back a response 712 cryptographically generated based on at least secret 706. For example, the RFID reader system and RFID IC 702 may exchange information in a challenge-response interaction, by encrypting or decrypting the information, by digitally signing the information, or in any other scheme involving the use of secret 706. The RFID reader system may know or be able to determine secret 706. For example, the RFID reader system may use identifier 704 to look up, derive, or otherwise determine secret 706 associated with RFID IC 702. In some embodiments, the RFID reader system may determine the secret associated with an RFID IC identifier using a database, such as database 714. In diagram 700, database 714 stores information about RFID IC identifiers and associated secrets. For example, database 714 indicates that RFID IC identifier "ABCDEFGH" is associated with secret 706, whereas RFID IC identifier "BCDEFGHI" is associated with secret 708. Database 714 may be implemented at the RFID reader system or at a remote location accessible to the RFID reader system.

Upon determining secret 706, the RFID reader system can determine whether response 712 received from RFID IC 702 is correctly based on secret 706, in order to authenticate RFID IC 702. For example, the RFID reader system may have previously sent a challenge to RFID IC 702. RFID IC 702 may in turn generate response 712 based on the challenge and secret 706 and send the generated response 712 back to the RFID reader system. If the RFID reader system determines that response 712 is correctly based on secret 706, then the RFID reader system can confirm that RFID IC 702 knows secret 706, is correctly associated with identifier "ABCDEFGH", and therefore is authentic, as indicated by label 720. Upon determining that response 712 is not correctly based on secret 706, the RFID reader system may attempt another cryptographic interaction, provide an alert (for example, to another entity) of the failed authentication, record the failed authentication, or perform any other suitable action.

The length of an identifier determines the number of possible unique identifiers. The longer the identifier, the more unique identifiers are possible. At the same time, longer identifiers may require more memory on an RFID IC to store, increasing RFID IC cost.

In some embodiments, an RFID IC may be uniquely identified using its unique secret and only a portion of its complete, unique identifier. For example, an RFID IC may only store a portion of its complete identifier and not the entire, complete identifier, thereby reducing the identifier memory required on the IC. During communications with an RFID reader system, the RFID IC may send its stored identifier portion, as well as a response generated based on its unique secret. The RFID reader system then uses the identifier portion to determine the secret associated with the sending RFID IC. The identifier portion, being shorter than the complete identifier, may not be uniquely associated with the sending RFID IC. In fact, multiple RFID ICs may have the identifier portion in their complete identifiers. In this situation, the RFID reader system may determine that the identifier portion corresponds to multiple secrets, where each secret is uniquely associated with a different RFID IC. The RFID reader system may then iterate through the multiple secrets to determine the specific secret upon which the generated response is based. Upon determining the specific secret upon which the generated response is based (and presumably associated with the sending RFID IC), the RFID reader system may use the specific secret to determine one or more other portions of the sending RFID IC's complete identifier.

Diagram 750 illustrates an example of how an RFID IC only storing a portion of its complete identifier can be identified. In diagram 750, RFID IC 752 is associated with complete identifier "JKLMNOPQ", but stores portion 754 "JKLM" of its complete identifier and not the other portion (i.e., "NOPQ"). RFID IC 752 also stores and is uniquely (at least within the constraints of a finite-length secret) associated with secret 756.

During communications with an RFID reader system, RFID IC 752 may send identifier portion 754 and a response 762 cryptographically generated based on secret 756. The RFID reader system may use identifier portion 754 to look up, derive, or otherwise determine one or more associated secrets.

In some embodiments, the RFID reader system accesses a database storing identifier portion and secret information, such as database 764 in diagram 750, to determine associated secret(s). Database 764 stores information about RFID IC identifiers and secrets. Specifically, database 764 may store information relating identifier portions to secrets. For example, database 764 may indicate that an RFID IC having identifier portion 754 ("JKLM") may have secret 756, secret 758, or another secret. The RFID reader system, upon determining the potential secrets that could be associated with RFID IC 752, may then test whether response 762 is correctly based on any of the potential secrets. For example, the RFID reader system may determine that response 762 is not correctly based on secret 758 but is correctly based on secret 756. The RFID reader system may test whether response 762 is correctly based on a secret by attempting to recover a known value (for example, a previously sent challenge or parameter) from response 762 using the secret. The RFID reader system may halt the determination after a successful test even if all of the potential secrets have not been tested, or may test more or all of the potential secrets.

After determining the specific secret that response 762 is based on, the RFID reader system may use the specific secret to determine one or more other portions of RFID IC 752's complete identifier. In one embodiment, database 764 also stores information about identifier portion(s) associated with different secrets. For example, database 764 may indicate that an RFID IC that has identifier portion 754 and secret 756 also has identifier portion "NOPQ", whereas an RFID IC that has identifier portion 754 and secret 758 has identifier portion "RSTU". The RFID reader system, upon determining that RFID IC 752 has identifier portion 754 and that response 762 from RFID IC 752 is correctly based on secret 756, can then consult database 764 to determine that RFID IC 752 also has identifier portion "NOPQ". The RFID reader system can then assemble identifier portion 754 and the determined identifier portion "NOPQ" to determine the complete identifier "JKLMNOPQ" associated with RFID IC 752. Accordingly, as labeled by 770, the RFID reader system can (a) determine the complete identifier associated with RFID IC 752 despite only receiving a portion of the complete identifier from IC 752, and (b) authenticate RFID IC 752 by confirming that RFID IC 752 knows secret 756.

In some embodiments, the determination that a response from an RFID IC is correctly based on a secret may not be sufficient to authenticate the RFID IC, because the response may coincidentally be based on the secret. In this situation, an additional challenge-response interaction may be required before the RFID IC can be authenticated. The additional challenge-response interaction may begin with the reader system sending another challenge to the RFID IC. The other challenge may include an unencrypted value or a value encrypted using the determined secret. The reader system then determines whether a received response is correctly based on the determined secret. For example, if the challenge included the unencrypted value, the reader system may determine if the response includes something from which the unencrypted value can be recovered using the determined secret. If the challenge included the value encrypted with the determined secret, the reader system may determine if the response includes the unencrypted value. If the reader system determines that the received response is correctly based on the determined secret, then the reader system may have higher confidence that the RFID IC knows the determined secret and is therefore authentic. If the reader system fails to confirm that the received response is correctly based on the determined secret, then the reader system may try again, provide an alert (for example, to another entity) of the failure, record the failure, or perform any other suitable action.

In some embodiments, an RFID reader system may not use an RFID IC identifier portion to determine potential secrets. For example, an RFID IC may not store an identifier portion, and may only send a secret-based response to an RFID reader system. In this situation, the RFID reader system may test whether the response is correctly based on any secret accessible by the RFID reader system. Upon identifying such a secret, the RFID reader system may use the secret to determine a complete identifier for the RFID IC. For example, the secret may be associated with an RFID IC identifier, similar to how in diagram 750 secrets are associated with identifier portions. If identifier portions are not used to narrow the potential set of secrets, determining the specific secret that a response is correctly based on may be time-consuming or computationally intensive if the potential set of secrets is large. Nevertheless, determining an RFID IC complete identifier using only a secret-based response may be done and is within the scope of this disclosure, especially if processing time or computational capability is not an issue. Moreover, in some embodiments other criteria may be used (instead of or in addition to an identifier portion) to limit or narrow the set of potential secrets, such as IC/item location, IC/item history, time of the response, statistical parameters, deployment parameters (for example, the knowledge that a certain RFID IC version was deployed in a certain location at a certain time), the identities of other RFID ICs present or recently detected, or similar.

In FIG. 7, an RFID reader system consults database 714 or 764 to determine the secrets and/or identifier portions associated with RFID ICs. Databases 714 and 764 may be implemented in any suitable way. For example, databases 714 and 764 may be implemented as monolithic databases or distributed databases. Databases 714/764 may be at least partially located at the RFID reader system, or accessible to the RFID reader system via one or more networks. In some embodiments, RFID IC-related secret and/or identifier information may be provided by one or more services accessible to the RFID reader system. Such services may store the information in databases, or in any other suitable data storage scheme. In some embodiments, the information may be generated using one or more inputs and algorithms. For example, some or all of an RFID IC's identifier may be algorithmically generated based on the RFID IC's secret, and vice-versa. In this situation, a service may be configured to algorithmically generate some or all of an RFID IC's identifier and/or secret in response to a request from a suitably authorized RFID reader system. The service may determine the requesting system's authorization in any suitable way, such as using a cryptographic challenge-response interaction, digital signatures, or similar.

The RFID reader system described above in FIG. 7 may include one or more RFID readers configured to communicate with RFID tag ICs, one or more processor blocks, processor modules, or controllers configured to perform the described determinations, and one or more data storage components configured to store RFID IC information, such as identifiers, identifier portions, and/or secrets. These system components may be co-located (for example, implemented within the same device), distributed, or a combination of the two. In some embodiments, certain functions and features may be distributed across or performed by multiple devices. For example, information for a single RFID IC may be stored on multiple data storage components, and determination of RFID IC information as described above may be performed by multiple processor blocks, serially or in parallel.

Figure 8:
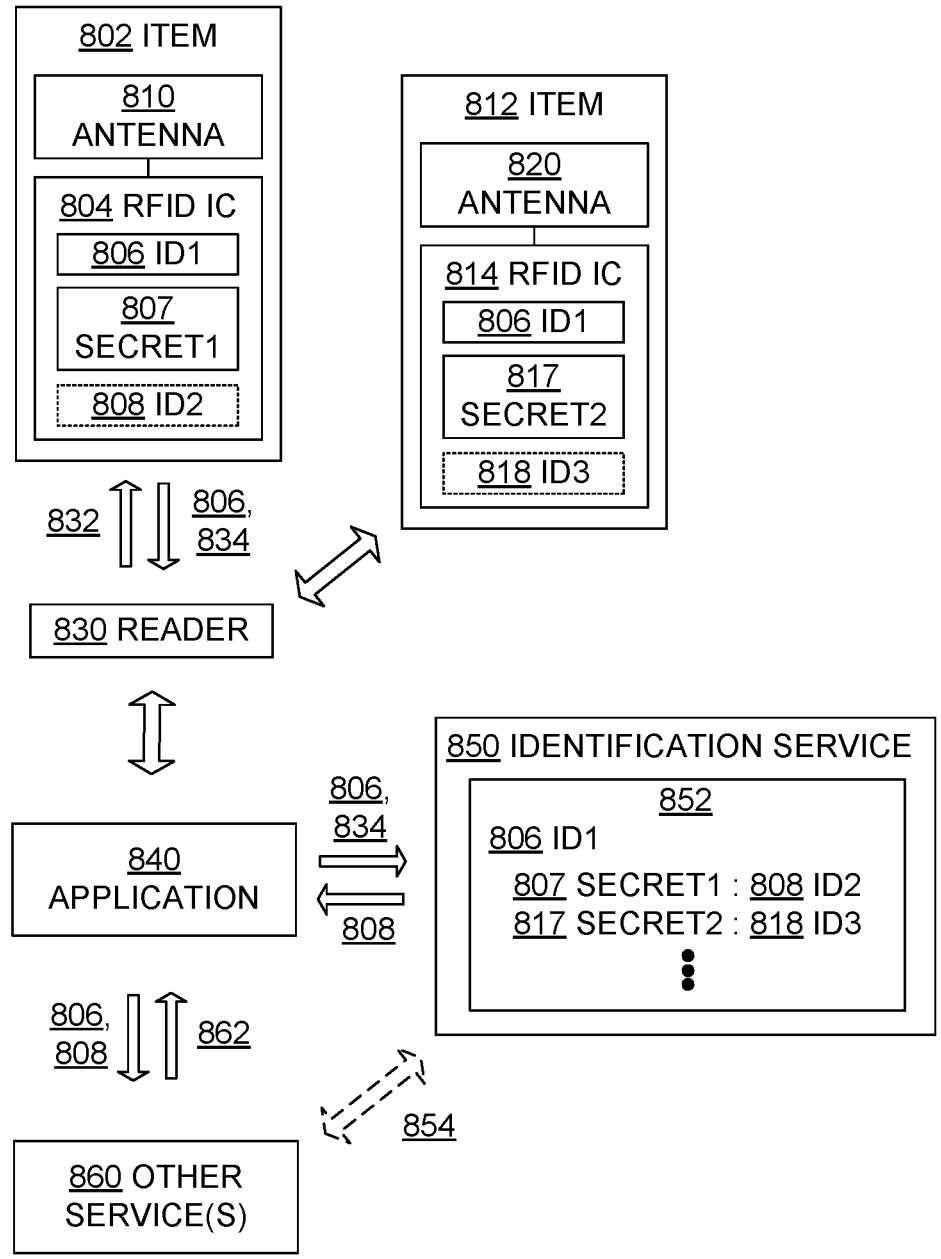
FIG. 8 depicts how an application can determine identifiers for RFID ICs and use the identifiers to access related services and information, according to embodiments.

FIG. 8 depicts how an application can determine identifiers for RFID ICs and use the identifiers to access related services and information, according to embodiments. Diagram 800 depicts items 802 and 812. Each of the items 802/812 has an associated RFID IC (804 and 814, respectively) coupled to an antenna (810 and 820, respectively) used to send and receive RF signals to RFID readers. Each of the RFID ICs 804 and 814 stores an identifier portion ID1 806, a secret (secret1 807 and secret2 817, respectively), and may optionally store another identifier portion (ID2 808 and ID3 818, respectively).

In diagram 800, an entity may use an application 840 to retrieve information or access a service associated with item 802. Application 840 may cause an RFID reader 830 to communicate with RFID IC 804, associated with item 802. Application 840 may be a software program executing on reader 830, a processor or controller associated with reader 830, and/or a processor or controller coupled through one or more networks to reader 830. In some embodiments, reader 830 sends a message 832 with an identifier request and/or a challenge to RFID IC 804. RFID IC 804 may then send back ID1 806 and/or a response 834 cryptographically generated based on the challenge and secret1 807. Reader 830 may then forward ID1 806 and/or response 834 to application 840.

Application 840 may be a software program executing on reader 830, a processor or controller associated with reader 830, and/or a processor or controller coupled through one or more networks to reader 830.

ID1 806 by itself is insufficient to uniquely identify RFID IC 804 and item 802, because RFID IC 814, associated with item 812, also stores ID1 806. Accordingly, both ID1 806 and response 834 may be needed to uniquely identify RFID IC 804/item 802.

In some embodiments, unique identification and authentication of an RFID IC or item may be provided by one or more services. A service is an entity, application, or similar that receives and responds to requests for functionality over one or more networks. Diagram 800 depicts an identification service 850. Identification service 850 is configured to use an identifier portion and a cryptographic response to determine one or more corresponding identifier portions, like the technique described in FIG. 7. Identification service 850 may have access to the different secret(s) associated with an identifier portion. In some embodiments, identification service 850 may store associations between identifier portions and secrets in a database 852, which may be local to or remote from identification service 850. Identification service 850 may be configured to use the secret(s) to verify whether a response allegedly based on a certain secret actually is based on that secret. In some embodiments, identification service 850 may have access to or implement one or more cryptographic algorithms, engines, or similar functionality that allows encryption, decryption, or any other suitable cryptographic functionality.

Furthermore, identification service 850 may have access to or store (for example, in database 852) identifier portions associated with each of the different secret(s). Upon verifying that a response is based on a certain secret, identification service 850 may then determine one or more identifier portions associated with that secret. Identification service 850 may then transmit the identifier portion(s) to the requester or use the identifier portion(s) to access associated services or information.

In diagram 800, application 840 may use identification service 850 to determine both (a) whether RFID IC 804 (and by extension item 802) is authentic, and (b) the unique identifier associated with RFID IC 804. To do so, application 840 sends ID1 806 and response 834 to identification service 850, with an implicit or explicit request to determine any other existing identifier portion(s). Application 840 may also provide information about the challenge sent to RFID IC 804 to identification service 850, if identification service 850 does not already have access to the information. For example, identification service 850 may have previously provided the challenge to application 840, in which case identification service 850 may itself already possess the challenge information.

Identification service 850 may first determine whether the request from application 840 is authentic, authorized, and/or should be complied with, via any suitable means. For example, identification service 850 may determine whether application 840 and/or an associated entity are authentic (e.g., via a challenge-response interaction, electronic signature verification, or any other suitable cryptographic interaction); whether the request itself is authentic (e.g., via electronic signature verification or other suitable cryptographic interaction); whether application 840 and/or associated entity, if authentic, are authorized to access the functionality of and/or information from identification service 850; or any other suitable way of determining whether the request from application 840 should be complied with.

If identification service 850 determines that the request from application 840 should not be complied with, identification service 850 may notify application 840 accordingly. For example, identification service 850 may send an error message to application 840. The error message may indicate the reason(s) why the request cannot be complied with. In some embodiments, identification service 850 may also (or instead) record the determination and/or notify another entity or authority (e.g., the police, a government organization, etc.) of the determination.

Upon determining that the request from application 840 should be complied with, identification service 850 uses ID1 806 to determine one or more corresponding secrets. For example, identification service 850 may consult database 852 to determine that ID1 806 corresponds to at least secret1 807 and secret2 817. Identification service 850 may then attempt to use secret1 807, secret2 817, and/or any other secrets corresponding to ID1 806 to verify response 834. In some embodiments, identification service 850 may iteratively use the secrets to verify response 834 until at least one secret is successfully used to verify response 834.

If identification service 850 does not successfully verify response 834 using a secret corresponding to ID1 806, then identification service 850 may record the failure and/or notify application 840 and/or another entity, such as an enforcement authority, manufacturer(s) of RFID IC 804 and/or item 802 (if they can be identified), or similar. Alternatively, identification service 850 may attempt to verify response 834 using other secrets, even those not corresponding to ID1 806. If identification service 850 does verify response 834 using another secret, identification service 850 may send identifier portion(s) associated with the other secret, may notify application 840 that response 834 was verified using a secret not corresponding to ID1 806, may record the verification, and/or may notify an enforcement authority.

On the other hand, if identification service 850 successfully verifies response 834 using a certain secret, identification service 850 may determine one or more identifier portions associated with the secret. For example, identification service 850 may successfully verify response 834 using secret1 807. Upon determining that secret1 807 is associated with identifier portion ID2 808, identification service 850 may send ID2 808 back to application 840.

If identification service 850 successfully verifies response 834 using a certain secret, then identification service 850 has also authenticated item 902 and its associated RFID IC 804, which originally provided response 834. In this case, identification service 850 may also operate as an authentication service for verifying the authenticity of items.

Application 840 may then use a combination of at least identifier portion ID1 806 and identifier portion ID2 808 to access information and/or services associated with item 802 and/or RFID IC 804. For example, application 840 may send the identifier combination to one or more other services 860, and in response other service(s) 860 may send back information 862 and/or provide appropriate services related to item 802 and/or RFID IC 804. Other service(s) 860 may be configured to provide any suitable information or services associated or related to item 802 and/or RFID IC 804, such as those described in commonly-assigned U.S. patent application Ser. No. 16/137,568, hereby incorporated by reference in its entirety.

The unique, complete identifier of an item or IC may include one or more portions. For example, in the description above a complete identifier includes at least two identifier portions, but in other embodiments a complete identifier may include three or more identifier portions. A complete identifier may be divided into identifier portions in any suitable way. In some embodiments, different identifier portions may be contiguous or at least partly overlap. In other embodiments, an identifier portion may include non-contiguous/nonconsecutive bits or parts of the complete identifier. For example, if a complete identifier includes a string of bits, each having a position within the identifier, a first identifier portion may only include bits in odd positions within the complete identifier, while a second identifier portion may only include bits in even positions within the complete identifier. Each identifier portion may be stored/provided by an RFID IC or one or more identification and/or other services. For example, an RFID IC may store an identifier portion corresponding to the most-significant-bits or the least-significant-bits of the complete identifier. In some embodiments, the IC may not provide an identifier portion, and the complete identifier may be entirely determined based on the response and optionally other information not provided by the IC.

As mentioned previously, embodiments are directed to determining complete identifiers for RFID ICs and items. Embodiments additionally include programs, and methods of operation of the programs. A program is generally defined as a group of steps or operations leading to a desired result, due to the nature of the elements in the steps and their sequence. A program is usually advantageously implemented as a sequence of steps or operations for a processor, but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions, data, keys, signatures, and other data of a program made according to the embodiments. A storage medium according to the embodiments is a computer-readable medium, such as a memory, and is read by a processor of the type mentioned above. If a memory, it can be implemented in any of the ways and using any of the technologies described above.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

According to one example, an RFID reader system configured to identify and authenticate an RFID tag storing a tag key and associated with a complete identifier but only storing a first portion of the complete identifier is provided. The system includes a reader module configured to communicate with RFID tags and a processor coupled to the reader module. The processor is configured to request and receive, via the reader module, the first portion from the tag; send, via the reader module, a challenge to the tag; and receive, via the reader module, a cryptographic response from the tag. The processor is further configured to determine a set of identifiers having the first portion and determine a set of potential keys associated with the set of identifiers, where each potential key is associated with a respective identifier in the set of identifiers. The processor is further configured to identify a correct key corresponding to the tag key by attempting to recover the challenge from the cryptographic response using multiple potential keys, correctly recovering the challenge from the cryptographic response using a first one of the multiple potential keys, and selecting the first potential key as the correct key. The processor is further configured to use the correct key to authenticate the tag and determine another portion of the complete identifier different from the first portion, combine at least the first and other portions to form the complete identifier, and identify the tag using the complete identifier.

In some embodiments, the complete identifier may be an electronic product code (EPC) or a tag identifier (TID). The first portion may be a most-significant-bit portion or a least-significant-bit portion. The processor may be configured to determine the set of potential keys by derivation from the set of identifiers or lookup from a database using the set of identifiers. The processor may be configured to determine the other portion of the complete identifier from a first identifier in the set of identifiers corresponding to the correct key. The processor may be configured to authenticate the tag by sending, via the reader module, another challenge to the tag; receiving, via the reader module, another cryptographic response from the tag; and correctly recovering the other challenge from the other cryptographic response using the correct key. The processor may be configured to identify the tag by using the complete identifier to look up information associated with the tag and/or an item associated with the tag.

According to another example, a network component configured to identify and authenticate an RFID tag storing a tag key and associated with a complete identifier but only storing a first portion of the complete identifier is provided. The component includes an interface configured to communicate with an RFID reader system communicating with the RFID tag and a processor coupled to the interface. The processor is configured to receive, via the interface, the first portion and a cryptographic response based on a challenge; determine a set of identifiers having the first portion; and determine a set of potential keys associated with the set of identifiers, where each potential key is associated with a respective identifier in the set of identifiers. The processor is further configured to identify a correct key corresponding to the tag key by attempting to recover the challenge from the cryptographic response using multiple potential keys, correctly recovering the challenge from the cryptographic response using a first one of the multiple potential keys, and selecting the first potential key as the correct key. The processor is further configured to use the correct key to authenticate the tag and determine another portion of the complete identifier different from the first portion, combine at least the first and the other portions to form the complete identifier, and identify the tag using the complete identifier.

In some embodiments, the first portion may be a most-significant-bit portion or a least-significant-bit portion. The processor may be configured to determine the set of potential keys by derivation from the set of identifiers or lookup from a database using the set of identifiers. The processor may be configured to determine the other portion of the complete identifier from a first identifier in the set of identifiers corresponding to the correct key. The processor may be configured to authenticate the tag by sending, via the interface, another challenge to the tag; receiving, via the interface, another cryptographic response from the tag; and correctly recovering the other challenge from the other cryptographic response using the correct key. The processor may be configured to identify the tag by using the complete identifier to look up information associated with the tag and/or an item associated with the tag.

According to a further example, a service configured to execute on a network server and to identify and authenticate an RFID tag storing a tag key and associated with a complete identifier but only storing a first portion of the complete identifier is provided. The service is configured to receive, from a network interface, the first portion and a cryptographic response based on a previously provided challenge. The service is further configured to determine a set of identifiers having the first portion and determine a set of potential keys associated with the set of identifiers, where each potential key is associated with a respective identifier in the set of identifiers. The service is further configured to attempt to recover the challenge from the cryptographic response using a plurality of the potential keys and correctly recover the challenge from the cryptographic response using a first one of the potential keys. The service is further configured to use the first potential key to authenticate the tag and determine another portion of the complete identifier different from the first portion, combine at least the first and other portions to form the complete identifier, and identify the tag using the complete identifier.

In some embodiments, the service is further configured to receive the first portion and the cryptographic response from an RFID reader system coupled to the network interface. The first portion may be a most-significant-bit portion or a least-significant-bit portion. The service may be configured to determine the set of potential keys by derivation from the set of identifiers or lookup from a database using the set of identifiers. The service may be configured to determine the other portion of the complete identifier from a first identifier in the set of identifiers corresponding to the first potential key. The service may be configured to authenticate the tag by sending, via the interface, another challenge to the tag; receiving, via the interface, another cryptographic response from the tag; and correctly recovering the other challenge from the other cryptographic response using the first potential key. The service may be configured to identify the tag by using the complete identifier to look up information associated with the tag and/or an item associated with the tag.

The foregoing detailed description has set forth various embodiments of the devices and/or processes via the use of block diagrams and/or examples. Insofar as such block diagrams and/or examples contain one or more functions and/or aspects, each function and/or aspect within such block diagrams or examples may be implemented individually and/or collectively, by a wide range of hardware, software, firmware, or virtually any combination thereof. Some aspects of the embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). Any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. All language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. An RFID reader system configured to identify and authenticate an RFID tag storing a tag key and associated with but not storing an item identifier, the system comprising:
a reader module configured to communicate with RFID tags, and
a processor block coupled to the reader module and configured to:
request and receive, via the reader module, a first identifier from the tag;
send, via the reader module, a challenge to the tag;
receive, via the reader module, a cryptographic response from the tag;
determine a set of potential keys associated with the first identifier;
determine a set of potential identifiers associated with the set of potential keys,
wherein each potential identifier is associated with a respective key in the set of potential keys;
identify a correct key, wherein the correct key corresponds to the tag key, by:
failing to recover the challenge from the cryptographic response using a first one of the set of potential keys in a cryptographic algorithm, but
correctly recovering the challenge from the cryptographic response using a second one of the set of potential keys in the cryptographic algorithm;
select the second one of the set of potential keys as the correct key;
use the correct key to authenticate the tag; and
identify the tag using a potential identifier associated with the correct key as at least part of the item identifier.

2. The reader system of claim 1, wherein the potential identifier associated with the correct key is one of an electronic product code (EPC) and a tag identifier (TID).

3. The reader system of claim 1, wherein the first identifier is a portion of the item identifier.

4. The reader system of claim 1, wherein the processor block is configured to determine the set of potential keys by one of:
derivation from the first identifier, and
lookup from a database using the first identifier.

5. The reader system of claim 1, wherein the processor block is configured to authenticate the tag by:
sending, via the reader module, another challenge to the tag;
receiving, via the reader module, another cryptographic response from the tag; and
correctly recovering the other challenge from the other cryptographic response using the correct key.

6. The reader system of claim 1, wherein the processor block is configured to identify the tag by using the potential identifier associated with the correct key to look up information associated with one or more of the tag or an item associated with the tag.

7. A network component configured to identify and authenticate an RFID tag storing a tag key and associated with but not storing an item identifier, the component comprising:
an interface configured to communicate with one or more networks; and
a processor block coupled to the interface and configured to:
receive, via the interface, a first identifier originating from the tag;
send, via the interface, a challenge intended for the tag;
receive, via the interface, a cryptographic response originating from the tag;
determine a set of potential keys associated with the first identifier;
determine a set of potential identifiers associated with the set of potential keys,
wherein each potential identifier is associated with a respective key in the set of potential keys;
identify a correct key, wherein the correct key corresponds to the tag key, by:
failing to recover the challenge from the cryptographic response using a first one of the set of potential keys in a cryptographic algorithm, but
correctly recovering the challenge from the cryptographic response using a second one of the set of potential keys in the cryptographic algorithm;
select the second one of the set of potential keys as the correct key;
use the correct key to authenticate the tag; and
identify the tag using a potential identifier associated with the correct key as at least part of the item identifier.

8. The network component of claim 7, further configured to receive the first identifier from a networked RFID reader system.

9. The network component of claim 7, wherein the potential identifier associated with the correct key is one of an electronic product code (EPC) and a tag identifier (TID).

10. The network component of claim 7, wherein the first identifier is a portion of the item identifier.

11. The network component of claim 7, wherein the processor block is configured to determine the set of potential keys by one of:
derivation from the first identifier, and
lookup from a database using the first identifier.

12. The network component of claim 7, wherein the processor is configured to authenticate the tag by:
sending, via the interface, another challenge to the tag;
receiving, via the interface, another cryptographic response from the tag; and
correctly recovering the other challenge from the other cryptographic response using the correct key.

13. The network component of claim 7, wherein the processor block is configured to identify the tag by using the potential identifier to look up information associated with one or more of the tag or an item associated with the tag.

14. A service configured to execute on a network server and to identify and authenticate an RFID tag storing a tag key and associated with but not storing an item identifier, the service configured to:
receive, from a network interface, a first identifier originating from the tag;

determine a set of potential keys associated with the first identifier;

determine a set of potential identifiers associated with the set of potential keys, wherein each potential identifier is associated with a respective key in the set of potential keys;

identify a correct key, wherein the correct key corresponds to the tag key, by:
  failing to recover, from a cryptographic response originating from the tag and using a first one of the set of potential keys in a cryptographic algorithm, a previously provided challenge, but
  correctly recovering the previously provided challenge from the cryptographic response using a second one of the set of potential keys in the cryptographic algorithm;

select the second one of the set of potential keys as the correct key;

use the correct key to authenticate the tag; and identify the tag using a potential identifier associated with the correct key as at least part of the item identifier.

15. The service of claim 14, further configured to receive the first identifier and the cryptographic response from an RFID reader system coupled to the network interface.

16. The service of claim 14, wherein the first identifier is a portion of the item identifier.

17. The service of claim 14, wherein the potential identifier associated with the correct key is one of an electronic product code (EPC) and a tag identifier (TID).

18. The service of claim 14, further configured to determine the set of potential keys by one of:
  derivation from the first identifier, and
  lookup from a database using the first identifier.

19. The service of claim 14, further configured to authenticate the tag by:
  receiving, via the interface, another cryptographic response originating from the tag; and
  correctly recovering another challenge from the other cryptographic response using the second one of the set of potential keys.

20. The service of claim 14, further configured to identify the tag by using the potential identifier to look up information associated with one or more of the tag or an item associated with the tag.

* * * * *

UNITED STATES PATENT AND TRADEMARK OFFICE
CERTIFICATE OF CORRECTION

| | | |
|---|---|---|
| PATENT NO. | : 12,086,668 B1 | Page 1 of 1 |
| APPLICATION NO. | : 18/316311 | |
| DATED | : September 10, 2024 | |
| INVENTOR(S) | : Matthew Robshaw, Tan Mau Wu and Christopher J. Diorio | |

It is certified that error appears in the above-identified patent and that said Letters Patent is hereby corrected as shown below:

In the Specification

In Column 4, Line 50, Delete "MHZ," and insert -- MHz, --, therefor.

Signed and Sealed this
Thirty-first Day of December, 2024

Derrick Brent
*Acting Director of the United States Patent and Trademark Office*